Patented July 11, 1933

1,917,463

UNITED STATES PATENT OFFICE

PAUL LAWRENCE SALZBERG AND EUCLID WILFRED BOUSQUET, OF WILMINGTON, DELAWARE, ASSIGNORS TO E. I. DU PONT DE NEMOURS & COMPANY, OF WILMINGTON, DELAWARE, A CORPORATION OF DELAWARE

FLUOSILICATES OF ORGANIC ALIPHATIC BASES

No Drawing.    Application filed October 16, 1930.    Serial No. 489,230.

This invention relates to new compounds consisting of organic fluosilicates, and more particularly to the fluosilicates of aliphatic bases.

It is known that some of the organic aromatic bases react with hydrofluosilicic acid to give well defined crystalline salts of the general formula $R_2.H_2SiF_6$, where R equals the organic residue containing one basic nitrogen atom. Jacobson and Pray have described the preparation and some properties of the fluosilicates of aniline, mono-methyl aniline and o-, m-, and p-toluidine (J. A. C. S. 50, 3055 (1928)); Elber & Schott reported similarly on the fluosilicates of hydroxylamine (J. pr. Ch. (2), 78,338 (1908)) and hydrazine (J. pr. Ch. (2) 81,552 (1910)). The production of fluosilicates of aliphatic bases, and the mode herein disclosed of preparing these fluosilicates is, however, believed to be new.

This invention has as an object the production of new compounds consisting of fluosilicates of aliphatic bases. A further object is the production of fluosilicates of this class which are water soluble. A still further object resides in the method of preparing the above referred to fluosilicates of organic aliphatic bases.

These objects are accomplished by the following invention in which organic aliphatic bases are reacted in the presence of water with hydrofluosilicic acid, and the fluosilicate appropriately separated from its aqueous solution in the reaction mixture.

With respect to the general method of preparing these fluosilicates of organic aliphatic bases we prefer to react, below 60° C., the approximately 30% aqueous hydrofluosilicic acid of commerce and the aliphatic base in equivalent or neutralizing amounts. Thus, if the aliphatic base is a mono-amine, two moles will be reached with one mole of hydrofluosilicic acid, and if the aliphatic base is a di-amine, one mole will be reacted with one mole of the acid. Evaporation of the mixture at room temperature, preferably over sulfuric acid in a vacuum desiccator, yields the pure white crystalline organic fluosilicate. In some cases, it becomes practical to precipitate most of the organic fluosilicate from the aqueous reaction mixture by the slow addition of ethyl alcohol or acetone.

The following specific examples are illustrative of the method of preparing our new compounds.

EXAMPLE 1 n-Butylamine fluosilicate

Two-tenths mole (14.6 g.) of n-butylamine was slowly poured into 0.1 mole (46.9 g.) of 30.7% hydrofluosilicic acid while keeping the temperature below 60° C. Evaporation of the aqueous reaction mixture at room temperature over sulfuric acid in a vacuum desiccator gave a pure white crystalline product which was further purified by washing with several portions of ether. The white product when dry weighed 25 grams. This compound is quite volatile and sublimes very readily. It is very soluble in water, insoluble in ether and benzene and only slightly soluble in acetone and ethyl alcohol.

EXAMPLE 2

Di-n-butylamine fluosilicate

The aqueous reaction mixture from 0.1 mole (12.9 g.) of di-n-butylamine and 0.05 mole (23.45 g.) of 30.7% hydrofluosilicic acid was evaporated to dryness over sulfuric acid in a vacuum desiccator. The resulting white crystalline product was washed with benzine (B. P. 30–75° C.) and when dry gave 17.5 grams of pure white leaflets melting at 179–84° C. This fluosilicate is very soluble in water, insoluble in ether and benzene, and only slightly soluble in acetone and ethyl alcohol.

EXAMPLE 3

Tri-n-butylamine fluosilicate

An aqueous solution of 0.05 mole (23.45 g.) of 30.7% hydrofluosilicic acid was treated with 0.1 mole (18.5. g.) of tri-n-butylamine with the temperature below 60° C. Evaporation of this mixture gave a white crystalline product which was very soluble in water but insoluble in ether and benzene. The resulting compound is quite hygroscopic.

EXAMPLE 4

Benzylamine fluosilicate

A fine white crystalline precipitate was obtained upon addition of 0.2 mole (21.4 g.) of benzylamine to 0.1 mole (46.9 g.) of 30.7% hydrofluosilicic acid while keeping the temperature below 55° C. The mixture was concentrated by evaporation and diluted with absolute ethyl alcohol. The resulting crystalline product, after washing with absolute ethyl alcohol and with ether, weighed 34.1 grams and did not melt below 235° C. This compound sublimes very readily. It is soluble in water and insoluble in ether and benzene.

EXAMPLE 5

Triethanolamine fluosilicate

One-tenth mole (14.9 g.) of triethanolamine was mixed with 0.05 mole (23.45 g.) of 30.7% hydrofluosilicic acid below 60° C. Long white crystalline needles were obtained upon evaporation of the reaction mixture in a vacuum desiccator over phosphoric anhydride. This compound is very hygroscopic and absorbs moisture from the air very readily. It is soluble in alcohol, very soluble in water, and insoluble in ether and benzene.

EXAMPLE 6

B-amino-ethyl-aniline fluosilicate

A solution of 50 cc. of absolute ethyl alcohol and 0.1 mole (13.6 g.) of b-amino-ethyl-aniline was gently heated with 0.05 mole (23.45 g.) of 30.7% hydrofluosilicic acid. The white crystalline precipitate was filtered, washed with ether and dried. This compound is insoluble in ether and benzene, only slightly soluble in alcohol and ethyl acetate, and fairly soluble in water.

EXAMPLE 7

Ethylene diamine fluosilicate

A heavy white precipitate resulted upon addition of 0.2 mole (12 g.) of ethylene diamine to 0.2 mole (93.8 g.) of 30.7% hydrofluosilicic acid. This compound is moderately soluble in water, insoluble in ether and benzene, and only very slightly soluble in ethyl alcohol and acetone.

The fluosilicates of organic aliphatic bases are in general white crystalline solids readily soluble in water. They melt at fairly high temperatures, although rather volatile around 100° C., and some of them sublime. Analyses of these organic fluosilicates show that they possess the general formula $R_2-H_2SiF_6$, where R represents the organic aliphatic base containing one basic nitrogen atom. While it is to be understood that the present invention is not dependent or limited by the accuracy of the formulae used to represent our new compounds, it may be noted that where the aliphatic base contains a plurality of basic nitrogen atoms in the molecule, as for instance the ethylene diamine mentioned, the formula may be more generally expressed as

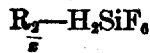

wherein R is an aliphatic basic nitrogen compound, and $x$ the number of basic nitrogen atoms utilized for the formation of the fluosilicate. When the base contains a plurality of nitrogen atoms in the molecule, several possibilities exist. For instance, if two nitrogen atoms are present in each molecule of the aliphatic base, the $H_2SiF_6$ group may be connected to one nitrogen atom of one molecule of the base and to one nitrogen atom of another molecule of the base, or both nitrogen atoms of one molecule of the base may be connected to the hydrofluosilicic acid group, or two molecules of the acid group may connect two molecules of the base, one molecule of the acid connecting a nitrogen atom of one molecule of the base with a nitrogen atom of the other molecule of the base, and the other acid molecule likewise connecting the two remaining nitrogen atoms.

Our invention comprehends all organic aliphatic bases with a sufficiently basic nitrogen atom to react with hydrofluosilicic acid. Thus the fluosilicates of alicyclic amines, such as cyclopentylamine or cyclohexylamine, are included as well as the alkyl, alkylene, and aralkyl amines. By the term aliphatic bases, we mean to include also molecules having other functional groups besides the basic nitrogen atom, such as amino nitriles, mono-b-hydroxy ethyl amine, and amino acids. It is to be understood, therefore, that the term "aliphatic" as used in the claims to designate our new compounds, consisting of the fluosilicates of organic aliphatic bases, refers to the fact that at least one of the groups attached to the basic nitrogen atom, or atoms, is an aliphatic organic group, and that the term aliphatic includes those organic groups which are only partially aliphatic, but which are joined to the nitrogen atom through the aliphatic constituent of the organic group. Thus in the general formula $R_2-H_2SiF_6$, wherein R is an amino compound or group having a single basic nitrogen atom, this group may be represented as

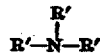

in which one of the R' values is an aliphatic organic residue which, as noted above, may consist of an alkyl group, an alkylene group, an aralkyl group, or an alicyclic group. The remaining R' constituents may represent hydrogen or any one of the aliphatic groups referred to in connection with the first mentioned value of R'.

While it is preferred to carry out the reaction between the aliphatic base and hydrofluosilicic acid at a temperature below 60° C., or more specifically about room temperature, a wider range of temperature may be used, the highest temperature being limited by the boiling point of the aqueous mixture, or by the temperature that the organic fluosilicate decomposes. It is convenient to use commercial hydrofluosilicic acid which is about 30% strength, but as long as the acid solution is not too dilute, other concentrations up to 100% may be used. An aqueous solution of these basic nitrogen compounds, soluble in water, may be reacted with hydrofluosilicic acid. The water present in the commercial acid is, however, sufficient to carry out the reaction.

These compounds and compositions containing them are useful as wool-preservatives, disinfectants, and antiseptics.

The organic fluosilicates of the present invention are easily prepared white, crystalline, non-inflammable solids, soluble in water, practically odorless and non-corrosive.

As many apparently widely different embodiments of this invention may be made without departing from the spirit and scope thereof, it is to be understood that we do not limit ourselves to the specific embodiments thereof except as defined in the appended claims.

We claim:

1. A fluosilicate of an organic aliphatic base.
2. A water soluble fluosilicate of an organic aliphatic base.
3. A fluosilicate having the probable general formula of $$R_x\text{—}H_2SiF_6,$$

wherein R is an aliphatic basic nitrogen compound, and $x$ the number of basic nitrogen atoms in each molecule of the basic nitrogen compound which are utilized for the formation of the fluosilicate.

4. A fluosilicate having the probable general formula of $$(R)_2\text{—}H_2SiF_6,$$

wherein R signifies a basic nitrogen compound of the structure of $$R'\text{—}\underset{|}{N}\text{—}R'$$
$$\phantom{R'\text{—}}R'$$

in which one of the R' values represents an organic aliphatic radical, each of the remaining R' values representing a univalent constituent selected from the class consisting of: hydrogen and an organic aliphatic radical.

5. A process which comprises reacting hydrofluosilicic acid with an organic aliphatic base.

6. A process which comprises reacting together hydrofluosilicic acid and an organic aliphatic base in the presence of water, and separating the organic aliphatic fluosilicate formed from the aqueous reaction mixture.

7. A process which comprises reacting together hydrofluosilicic acid and an organic aliphatic base in the presence of water, below 60° C., and separating the organic aliphatic fluosilicate formed from the aqueous reaction mixture.

In testimony whereof we affix our signatures.

PAUL LAWRENCE SALZBERG.
EUCLID WILFRED BOUSQUET.

CERTIFICATE OF CORRECTION.

Patent No. 1,917,463.                    July 11, 1933.

PAUL LAWRENCE SALZBERG, ET AL.

It is hereby certified that error appears in the printed specification of the above numbered patent requiring correction as follows: Page 3, line 12, for "wool-preservatives" read wood-preservatives; and that the said Letters Patent should be read with this correction therein that the same may conform to the record of the case in the Patent Office.

Signed and sealed this 19th day of May, A. D. 1936.

(Seal)

Leslie Frazer
Acting Commissioner of Patents.

decomposes. It is convenient to use commercial hydrofluosilicic acid which is about 30% strength, but as long as the acid solution is not too dilute, other concentrations up to 100% may be used. An aqueous solution of these basic nitrogen compounds, soluble in water, may be reacted with hydrofluosilicic acid. The water present in the commercial acid is, however, sufficient to carry out the reaction.

These compounds and compositions containing them are useful as wool-preservatives, disinfectants, and antiseptics.

The organic fluosilicates of the present invention are easily prepared white, crystalline, non-inflammable solids, soluble in water, practically odorless and non-corrosive.

As many apparently widely different embodiments of this invention may be made without departing from the spirit and scope thereof, it is to be understood that we do not limit ourselves to the specific embodiments thereof except as defined in the appended claims.

We claim:

1. A fluosilicate of an organic aliphatic base.

2. A water soluble fluosilicate of an organic aliphatic base.

3. A fluosilicate having the probable general formula of

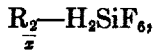

wherein R is an aliphatic basic nitrogen compound, and $x$ the number of basic nitrogen atoms in each molecule of the basic nitrogen compound which are utilized for the formation of the fluosilicate.

4. A fluosilicate having the probable general formula of

wherein R signifies a basic nitrogen compound of the structure of

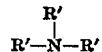

in which one of the R' values represents an organic aliphatic radical, each of the remaining R' values representing a univalent constituent selected from the class consisting of: hydrogen and an organic aliphatic radical.

5. A process which comprises reacting hydrofluosilicic acid with an organic aliphatic base.

6. A process which comprises reacting together hydrofluosilicic acid and an organic aliphatic base in the presence of water, and separating the organic aliphatic fluosilicate formed from the aqueous reaction mixture.

7. A process which comprises reacting together hydrofluosilicic acid and an organic aliphatic base in the presence of water, below 60° C., and separating the organic aliphatic fluosilicate formed from the aqueous reaction mixture.

In testimony whereof we affix our signatures.

PAUL LAWRENCE SALZBERG.
EUCLID WILFRED BOUSQUET.

CERTIFICATE OF CORRECTION.

Patent No. 1,917,463.  July 11, 1933.

PAUL LAWRENCE SALZBERG, ET AL.

It is hereby certified that error appears in the printed specification of the above numbered patent requiring correction as follows: Page 3, line 12, for "wool-preservatives" read wood-preservatives; and that the said Letters Patent should be read with this correction therein that the same may conform to the record of the case in the Patent Office.

Signed and sealed this 19th day of May, A. D. 1936.

Leslie Frazer
Acting Commissioner of Patents.

(Seal)

CERTIFICATE OF CORRECTION.

Patent No. 1,917,463.　　　　　　　　　　　　　　　　　July 11, 1933.

PAUL LAWRENCE SALZBERG, ET AL.

It is hereby certified that error appears in the printed specification of the above numbered patent requiring correction as follows: Page 3, line 12, for "wool-preservatives" read wood-preservatives; and that the said Letters Patent should be read with this correction therein that the same may conform to the record of the case in the Patent Office.

Signed and sealed this 19th day of May, A. D. 1936.

(Seal)
　　　　　　　　　　　　　　　　　　　Leslie Frazer
　　　　　　　　　　　　　　　Acting Commissioner of Patents.